Feb. 2, 1943.  A. HEPPERLE  2,309,899
ADJUSTABLE PITCH PROPELLER
Filed Feb. 17, 1941  3 Sheets-Sheet 1
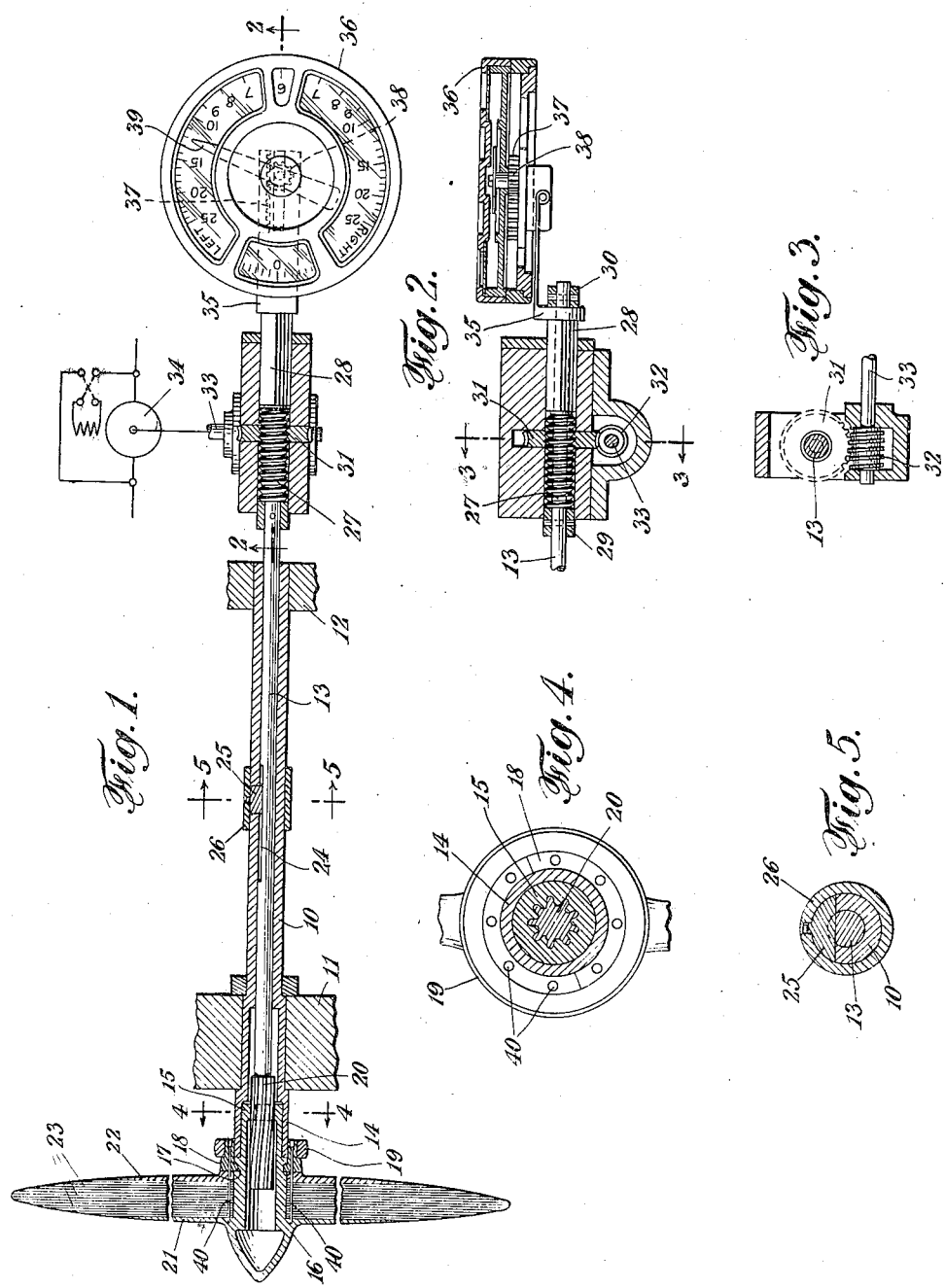
INVENTOR.
Adolf Hepperle.
BY
his ATTORNEY.

Feb. 2, 1943.  A. HEPPERLE  2,309,899
ADJUSTABLE PITCH PROPELLER
Filed Feb. 17, 1941  3 Sheets-Sheet 2
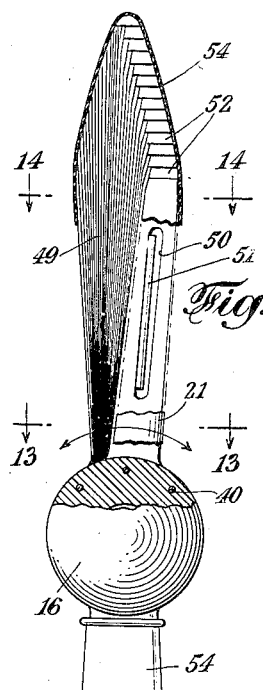
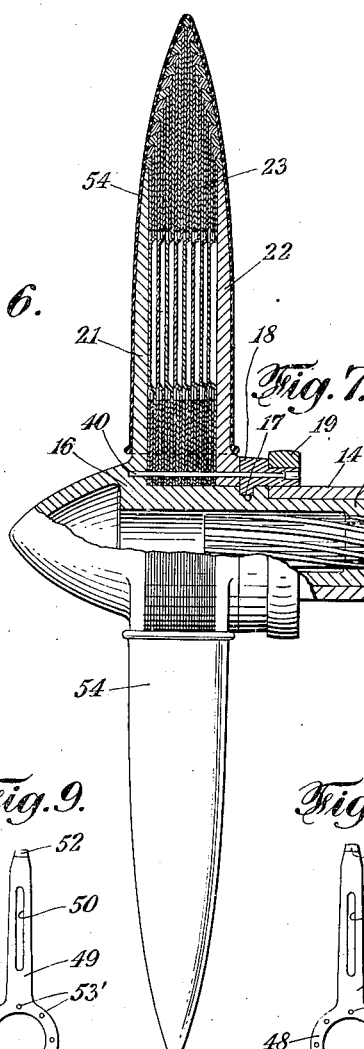
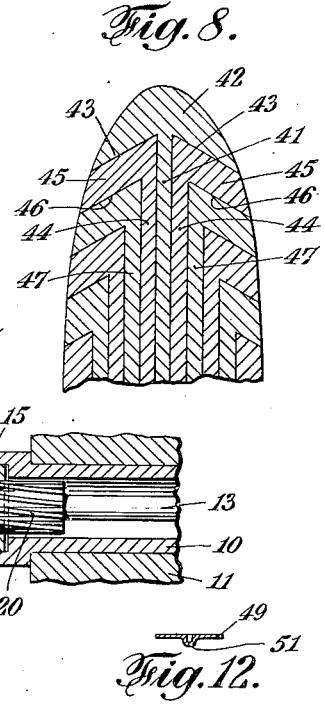
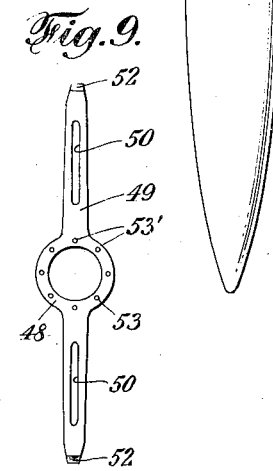
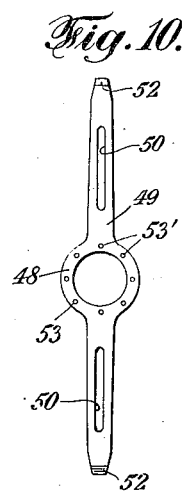
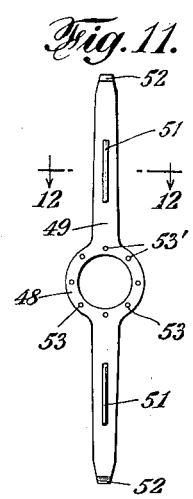
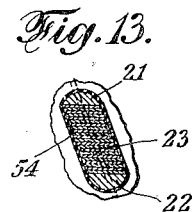
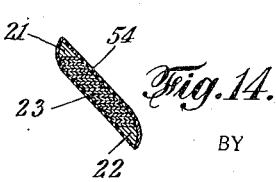
INVENTOR.
Adolf Hepperle
his ATTORNEY.

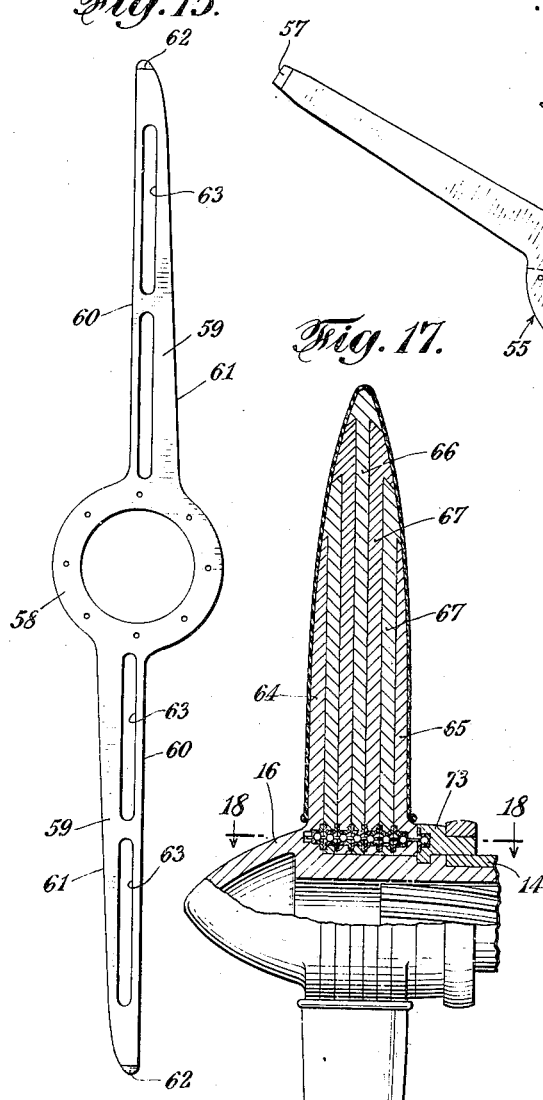
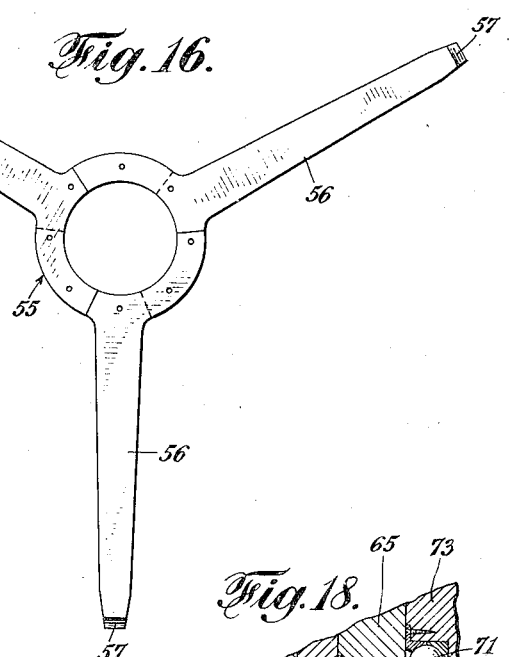
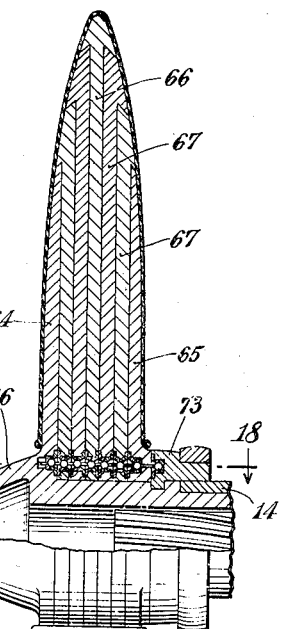
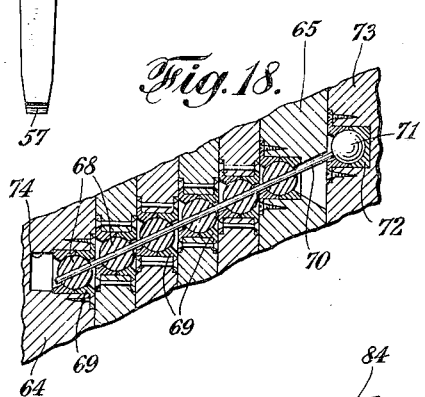
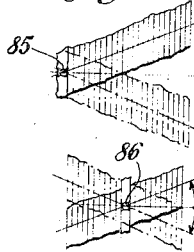

Patented Feb. 2, 1943

2,309,899

UNITED STATES PATENT OFFICE 2,309,899

ADJUSTABLE PITCH PROPELLER

Adolf Hepperle, North Bergen, N. J.

Application February 17, 1941, Serial No. 379,236

5 Claims. (Cl. 170—161)

This invention relates to adjustable, variable pitch propellers in general, and particularly to the kind applicable for use with both aircraft and vessels.

In heretofore employed variable pitch propellers, especially in those intended for use with airplane engines, the blades are usually bodily movable in respect to the plane of rotation of the propeller, which movement may be effected during flight, for the purpose of either increasing or decreasing the speed or power of an engine, thereby governing the speed of an aircraft.

The true pitch of a correctly designed propeller blade, and the shape of the blade resulting from such correct design, is determined by the simple expedient of imparting to a straight line, disposed perpendicularly to and passing through the axis of rotation of the future propeller, a progressive turning motion in the shape of a spiral or helix, the depth or height of which helix corresponds to the desired progress of the propeller made in one revolution.

Assume that a propeller is to be designed to operate at a certain speed in a medium of a certain density. These factors govern the required propeller pitch. The effectiveness of the propeller will be highest at that pitch, assumed to be the true propeller pitch. When the propeller is then bodily twisted about its longitudinal center axis, passing through the axis of rotation of the propeller, its blades will lose their efficiency because their bodies no longer are in their true pitch position designed for best effectiveness.

Another important disadvantage of heretofore employed variable pitch propellers resides in the fact that, due to the necessity of bodily moving the propeller blades about their longitudinal center lines, each propeller blade represents an individual entity which must be independently operable, and which therefore cannot be made an integral part of any other blade of the propeller. Consequently the structure wherein the individual propeller blades are mounted must necessarily be very strong and of a relatively heavy design in order to withstand the centrifugal force to which the individual blades are subjected. In addition, such individual blade construction necessitates a very powerful mechanism for effecting blade adjustments.

The present invention has for its purpose to overcome the disadvantages of present-day variable pitch propellers, and its principal objects are to provide a variable pitch propeller, designed to retain its true pitch formation at any adjustment imparted thereto, and wherein the blades of the propeller and their constituent parts mutually counterbalance themselves and effectively resist centrifugal force, and facilitate adjustment about the axis of rotation of the propeller, thereby minimizing the power necessary for effecting propeller adjustments.

Another object of this invention is to provide a variable pitch propeller, the blade position of which may be changed and adjusted in either direction in respect to the radial center line of the propeller blades, so as to render the propeller effective in either clockwise or anti-clockwise rotations.

Another object of this invention is to provide a variable pitch propeller composed of a plurality of self-balanced laminae, which may be simultaneously adjusted relative to one another, while being moved about the axis of rotation of the propeller.

Still another object of this invention is to construct a variable pitch propeller from a plurality of relatively thin, interengaged laminae, disposed and movable in parallel planes which are perpendicular to the axis of rotation of the propeller, and which laminae increase in length towards the longitudinal center plane of the propeller and are provided with interconnected hub structures capable of moving about the axis of rotation of the propeller, and means for actuating these hub structures to effect an adjustment of their laminae in respect to one another for the purpose of changing the pitch of the propeller without changing the trueness of the pitch.

Still another object of the invention is to provide for the aforesaid adjustable laminae of the propeller a yieldable, resilient covering intended to render smooth and relatively even and continuous the blade surfaces, which, due to their adjustments, present, when uncovered, a step-like formation.

The foregoing and still further objects and important advantages of the present invention will become more readily apparent from the ensuing description of the accompanying drawings, which latter, while forming an essential part of the present disclosure, are by no means intended to restrict the same to the actual showing.

In the drawings

Fig. 1 is a diagrammatical illustration of an adjustable pitch propeller and a mechanism for effecting its adjustment;

Fig. 2 is a cross sectional view taken on line 2—2 of Fig. 1;

Fig. 3 is a detail sectional view taken on line 3—3 of Fig. 2;

Fig. 4 is an enlarged section taken on line 4—4 of Fig. 1;

Fig. 5 is an enlarged section taken on line 5—5 of Fig. 1;

Fig. 6 is a front view, partially in section, of one of the forms of my propeller;

Fig. 7 is a side elevation thereof, partially in section;

Fig. 8 is an enlarged detail view of a typical tip end of a propeller blade;

Figs. 9, 10 and 11 illustrate plan views of laminae, graduated in size, from which my propeller blades are constructed;

Fig. 12 is a section taken on line 12—12 of Fig. 11;

Figs. 13 and 14 are propeller sections taken on lines 13—13 and 14—14, respectively, of Fig. 6;

Figs. 15 and 16 are plan views of other forms of propeller blade laminae;

Fig. 17 is a modified form of my propeller structure;

Fig. 18 is an enlarged cross sectional view taken on lines 18—18 of Fig. 17, through a modified form of propeller blade adjusting means shown in adjusted position, developed in a plane;

Fig. 19 is a section through another embodiment of blade adjusting means, similar to the one illustrated in Fig. 18; and Figs. 20 and 21 are diagrams illustrating two modified methods of adjustment of my variable pitch propeller.

Referring now specifically to Figs. 1 to 5, inclusive, these figures are intended to facilitate the explanation of the working principle of my invention, without, of course, binding me to the specific construction and organization disclosed. In these figures numeral 10 indicates the propeller shaft, which is lodged in bearings 11 and 12 or in any other suitable manner. The shaft is preferably hollow and accommodates a propeller-adjusting shaft or rod 13, which is designed to move longitudinally within shaft 10 and to rotate with it. The portion of shaft 10 extending from bearing 11 is enlarged at 14 for accommodating an extension 15 of propeller hub 16. This hub is recessed at 17 to receive an annular flange of a split collar 18. The latter is secured to enlargement 14, and its halves are held together by a lock ring 19.

The end of hub extension 15 is internally threaded and is engaged by a helically threaded member 20, affixed to the end of adjusting shaft or rod 13. Forming a part of, and extending from hub 16 is a front end laminae 21. A similar blade lamina 22 is mounted upon the hub body, and abuts with its hub structure against split ring 18. Between the two short ends laminae of the propeller are disposed parallelly, and closely adjacent to one another, propeller blade members or laminae 23, which increase in length toward the longitudinal center line or vertical center plane of the propeller blade, perpendicular to the propeller axis.

Approximately mid-way between bearings 11 and 12 adjusting shaft 13 is preferably flattened at 24. Against this flattened face of shaft 13 bears a key or guide member 25, extending through a suitable transverse slot provided in shaft 10, and held in position by means of a shaft reinforcing sleeve 26. This key arrangement is intended to prevent shaft 13 from rotating in respect to hollow shaft 10, while at the same time permitting a limited longitudinal adjustment of shaft 13 within shaft 10, the ends of slot 24 serving as movement limiting means. The end of shaft 13 projecting from bearings 12 passes through a hollow worm 27 and its hollow extension, in the form of a square guide member 28. Collars 29 and 30 secured to shaft 13, see Fig. 2, facilitate free rotation of the latter within worm 27 and square extension 28, when shaft 13 turns with shaft 10. At the same time these collars serve for the purpose of transmitting to shaft 13 a longitudinal movement, induced by the operation of worm 27. This worm is actuated by a worm gear 31, which latter in turn is driven by another worm 32 through shaft 33. This shaft is actuated by a reversible mechanism, as for instance a reversible motor indicated at 34.

Between square member 28 and collar 30 of shaft 13 is clamped an arm 35, see Fig. 2, which is connected to a pitch indicating gauge 36. This gauge is provided with a gear rack 37, operable by arm 35. The gear rack engages a pinion 38 mounted on a vertical shaft, to which is also secured an indicator needle 39. This needle swings over either a right or a left scale, denoting either right or left propeller pitch settings, ranging from between 6 to 25 feet per revolution. For non-reversible propellers a gauge with only a single scale is required.

Through suitable, aligned apertures provided in the hub structures of all blade laminae, and through corresponding bores in split ring 18, are passed flexible rods 40, by means of which all laminae are operatively connected with one another for the purpose of facilitating their relative adjustment, when the pitch of the propeller is to be changed.

Referring now to Figs. 6 and 7, it will be observed that rods 40 are fixedly held in the hub structure of the short front lamina 21 of the propeller, while they are movable in respect to the hub structures of all the other laminae and in respect to split ring 18, which latter is fixedly held upon enlargement 14 of shaft 10. The short heavy lamina 22, next to split ring 18, may be considered substantially stationary, while the rest of the laminae are movable. When now hub 16 is rotated in respect to shaft 10, this hub movement will cause the movement of the front ends of all rods 40, in consequence of which all hub structures interconnected by rods 40 will move also. The movement will be progressive in the direction from substantially stationary lamina 22 outwards to short lamina 21. The rotary movement of hub 16 is imparted thereto by the longitudinal movement of inner shaft 13 within shaft 10. Helical member 20, engaging threaded hub end 15, will cause the rotation of the hub in clockwise or anti-clockwise directions, depending upon the direction of movement of shaft 13.

As has been stated before, the propeller blade is composed of a plurality of adjacent laminae, which are disposed parallel to one another and are movable in parallel planes, directed perpendicularly to the axis of rotation of the propeller.

These laminae are movable relative to one another, although they are interlocked with one another in any suitable manner, such as, for instance, indicated in Fig. 8. The central or longest lamina 41 has an enlarged end or tip 42 which is undercut on a slant at 43. This undercut corresponds to a portion of a conical arc. The laminae next adjacent to center lamina 41 are indicated at 44 and are provided with fish-scale-shaped ends or tips 45, which are conically undercut at 46. The next pair of laminae is shown at 47 and so on. The construction of all ends or tips in the form of overlapping scales is identical for all laminae, except that the scales differ in size and width.

The blade designs illustrated in Figs. 6, 7 and 8 are intended to afford two-directional adjustment, and the type of laminae employed in these blades are illustrated in Figs. 9 to 14, inclusive, and also in Fig. 16.

As shown in Figs. 9, 10 and 11 these laminae consist of a hub structure 48, from which extend tapering blade elements 49, some of which are provided with longitudinal slots or spare-outs 50 in their bodies, while others possess pressed-out reinforcements 51, adapted to substantially register with slots 50, so as to allow a slight relative movement between two or more adjacent blade members. At the ends or tips of elements 49 are provided fish-scale resembling overhangs 52, intended to serve as guides for the ends of the elements and for keeping them in their proper adjacent position during any adjustment of the propeller blade.

Hub structure 48 of each lamina is provided with a plurality of apertures 53 for the reception of adjusting rods 40, as shown in Fig. 7.

The laminae or blade members are preferably of a flat, relatively thin construction and are increasing in length from without to within the blade body. In order that they may be assembled in their proper sequence, and rearranged after disassembly, some of the apertures 53 of hubs 48 are specially located. Thus, for instance, the two apertures indicated at 53' are closer to one another than the other apertures 53, which are equally spaced. The laminae are preferably made as thin as possible so that when they are adjusted the resulting blade surfaces will have a very minute step-like formation. The steps of this formation increase in size towards the ends of the propeller blades, and especially at the tapered tip ends of the individual laminae. Thus the blades would have, when left bare, undesirably rough blade surface. For this reason I provided a removable, yieldable, resilient cover 54, which is slipped over the blade body. This cover allows for any adjustment of the propeller blades, and is intended to render relatively smooth and even the otherwise uneven surfaces of the adjusted blade.

When blades from very thin laminae are constructed, I have found it advantageous to provide slots 50 in two or more adjacent laminae, and for each slotted group of laminae to use one lamina with a reinforcing ridge 51, the latter being of sufficient depth to pass through all slots of the group. In this manner all laminae of a blade are bodily interconnected with one another, and also, by means of their scale formations, at their tip ends.

In Fig. 16 a blade member or blade element for a three-blade-propeller is illustrated. This element in reality is composed of three overlying parts, forming a hub structure 55, which consists of three ring segments, from each of which extends a tapering blade element 56, having a reduced tip or end, terminating in scale formations 57. The ring segments of the hub structure are perforated for the reception of actuating rods, in a way similar to that described previously. Moreover, these perforations also facilitate the retention of the hub structure in its intended ring shape.

Another construction of a lamina or blade member is illustrated in Fig. 15, wherein is shown a one-piece hub structure 58, from which extend blade elements 59. These elements possess two edges, the one marked 60 substantially coinciding with the radius of the circle in which the blade element operates, while the other edge 61 tapers and is gradually curved at the end of the element towards radial edge 60. The usual end-guides in the form of a scale 62 are provided at the tips of the element. Parallel with edges 60 are arranged one or more slots 63, in some of the blade elements, while other elements, not shown, possess reinforcing ribs, such as illustrated in Figs. 11 and 12 at 51. The lamina shown in Fig. 15 is intended for adjustable propellers having but a one-directional adjustment, and this type of an element may be considered as most correctly designed, in view of the basic theory of propeller pitch construction, mentioned at the beginning.

When right and left hand adjustments of propellers are desired, laminae of constructions similar to those shown in Figs. 6 to 14 must be employed, wherein the bodies of the blade elements are symmetrically disposed in respect to their longitudinal central line, which latter coincides with the radius of the circle of rotation of the blade element. Nevertheless even with this relatively faulty element construction a propeller pitch very nearly approaching the true pitch may be maintained at any blade adjustment.

As illustrated in Figs. 17, 18 and 19, the propeller laminae may be constructed somewhat heavier if desired, which heavier construction is specially adapted for propeller blades intended for one-directional adjustment. In Fig. 17 is again illustrated a hub 16, provided with an integral end element 64, opposite which is disposed relatively stationary end element 65. Between these two end elements is arranged a central element 66 and a plurality of intermediate elements 67. All elements are adjustable in respect to element 65. The adjusting rods in this construction are substituted either by a ball and socket arrangement, such as shown enlarged in Fig. 18, or a similar arrangement illustrated in Fig. 19. In the former design a plurality of balls 68 are lodge in suitable sockets 69, one ball and one socket serving one of the blade elements. Through all balls 68 passes a rod 70, which is held in and extends from a ball 71, lodged in a socket 72. This socket is mounted in split ring 73. When hub 16 is rotated in respect to shaft enlargement 14, the shifting of all blade elements takes place. In order to allow for the movement of rod 70, end element 64 is provided with a recess 74 in rear of its ball socket 69. In the previous description and in that describing Fig. 18 it was stated that the end element nearest to the split ring is relatively stationary. Actually, however, it is movable in respect to the split ring, but the movement is small compared with the movement of the other blade elements.

Referring to Fig. 19, here is illustrated a blade adjusting arrangement similar to, but somewhat different from that shown in Fig. 18. The two end elements 75 and 76, and intermediate elements 77, are all provided with sockets 78 and balls. All balls have cylindrical recesses and cylindrical extensions, which latter fit into these recesses. The balls of end element 75 and intermediate elements 77 are designated at 79 and are of uniform construction. Ball 80 in lamina 76 is provided with the longest extension 81, which engages a recess in ball 82, lodged in a socket 83 of split ring 84. It will be observed that between the ends of the ball extensions and the interior ends of the recesses there are provided sufficient spaces for facilitating the adjustment of the laminae to a position at which the balls will be in a line parallel with the axis of rotation of the propeller. Such adjustment obviously is also possible in the construction shown in Fig. 18.

In the heretofore described blade adjusting arrangements it is assumed that the front blade lamina is the one which imparts the adjusting movement, through the hub adjusting devices, to the rest of the elements, and that the rear-end elements, such as elements 22 of Fig. 7, and 65 of Fig. 17, are relatively stationary elements, although the really stationary part of the adjusting device are the split rings secured to shaft enlargement 14.

In Figs. 20 and 21 other adjusting methods are indicated, wherein either the front element, in Fig. 20, or an intermediate element, in Fig. 21, is intended to be relatively stationary and about which the adjusting instrumentalities, and through them the rest of the laminae, are rendered movable. Thus in Fig. 20 a theoretical fulcrum for the adjusting means is indicated at 85, and in Fig. 21 a similar fulcrum is marked 86. Such transfer of fulcra will of course necessitate somewhat different adjusting mechanisms from those described in connection with Figs. 7, 17 to 19, although the ultimate results of providing correct pitch adjustments for blades, while always maintaining the adjusted blades at a true pitch form, will not be affected.

Due to the fact that each blade lamina is made substantially from one piece of material, and since due to its construction its body is fully balanced, the centrifugal force, to which it is subjected while the propeller rotates, will have little effect upon its adjusting movement. In other words the laminated blade structure relieves the strain under which present-day adjustable pitch propellers have to operate. The fact that all the laminae are twisted in their movement about the axis of rotation of the propeller, whereby the adjustable means are also twisted to substantially helical forms, accounts for the maintenance of the true pitch for any adjustment of the propeller. Obviously the adjusting means for the laminae are of but secondary importance, and any suitable adjusting mechanism may be substituted for those shown and described.

Thus, while I have disclosed herein specific forms of construction, it is to be understood that the drawings are serving for explanatory purposes only, and that changes and improvements are contemplated when the present invention is translated into full-size devices, and I therefore reserve for myself the right to make changes and improvements therein, within the broad scope of this invention, as expressed in the annexed claims.

I claim:

1. In an adjustable pitch propeller, a propeller blade composed of a plurality of articulated, relatively flat and closely adjacent individual laminae which are interconnected with and are adapted to be individually movable in either clockwise or anti-clockwise directions in respect to each other in parallel planes perpendicular to the axis of rotation, each lamina having an individual hub structure, the hub structures of all laminae being aligned and adjustably connected with one another, and means connecting said hub structures and adapted to facilitate their movement about the axis of rotation in respect to each other in a twisting or spiral fashion for effecting an adjusting movement of the laminae in the manner stated.

2. In an adjustable pitch propeller, as per claim 1, and wherein said laminae increase in length towards the center of the propeller blade.

3. In an adjustable pitch propeller, as per claim 1, and wherein said laminae increase in length towards the center of the propeller blade, and wherein one of the laminae is relatively stationary, whereas the other laminae are movable in respect to said one stationary lamina and in respect to each other.

4. In an adjustable pitch propeller, as per claim 1, and wherein said laminae increase in length towards the center of the propeller blade, and wherein said hub structures constitute ring-shaped forms concentric with the axis of rotation.

5. In an adjustable pitch propeller, adapted to maintain true pitch characteristics at any desired adjustment, a plurality of individual, articulated, self-balanced, parallelly disposed, relatively flat and closely adjacent laminae, each lamina being individually movable in a plane perpendicular to the axis of rotation of the propeller, each lamina consisting of a hub enlargement and at least two blade members extending substantially radially therefrom, means for interengaging and facilitating, but limiting the adjusting movements of each two adjacent blade members in respect to one another; the hub enlargements of the laminae being axially aligned and having interconnecting means arranged to impart to them an axial twisting movement, whereby a fan-like adjustment of the laminae in parallel planes is effected in either clockwise or anti-clockwise directions; said blade members increasing in length towards the center of the propeller body and their ends being in interlocking engagement with one another, and a flexible cover extending over the interlocking ends and the bodies of the blade members for evening and rendering continuous the outer, closely adjacent surfaces of the laminae.

ADOLF HEPPERLE.